(12) United States Patent
Hacker et al.

(10) Patent No.: US 10,984,282 B2
(45) Date of Patent: Apr. 20, 2021

(54) NEURAL VENDING MACHINE

(71) Applicant: The NORDAM Group LLC, Tulsa, OK (US)

(72) Inventors: Mark Robert Hacker, Little Horwood (GB); Raegen Henry Siegfried, Tulsa, OK (US)

(73) Assignee: The NORDAM Group LLC, Tulsa, OK (US)

( * ) Notice: Subject to any disclaimer, the term of this patent is extended or adjusted under 35 U.S.C. 154(b) by 50 days.

(21) Appl. No.: 16/567,001

(22) Filed: Sep. 11, 2019

(65) Prior Publication Data

US 2020/0125888 A1    Apr. 23, 2020

Related U.S. Application Data

(60) Provisional application No. 62/748,398, filed on Oct. 20, 2018.

(51) Int. Cl.
| | |
|---|---|
| G06K 9/62 | (2006.01) |
| G06N 3/08 | (2006.01) |
| G06N 3/04 | (2006.01) |
| G06Q 10/08 | (2012.01) |
| G06T 7/70 | (2017.01) |

(Continued)

(52) U.S. Cl.
CPC ............. *G06K 9/6201* (2013.01); *G06K 9/46* (2013.01); *G06K 9/6262* (2013.01); *G06N 3/0454* (2013.01); *G06N 3/08* (2013.01); *G06Q 10/087* (2013.01); *G06T 7/70* (2017.01); *G06T 7/97* (2017.01); *G06K 2209/01* (2013.01); *G06T 2207/20084* (2013.01)

(58) Field of Classification Search
CPC ...... G06K 9/6201; G06K 9/6262; G06K 9/46; G06K 2209/01; G06N 3/08; G06N 3/0454; G06Q 10/087; G06T 7/97; G06T 7/70; G06T 2207/20084
See application file for complete search history.

(56) References Cited

U.S. PATENT DOCUMENTS

| | | |
|---|---|---|
| 5,728,999 A | 3/1998 | Teicher |
| 6,315,197 B1 | 11/2001 | Beardsley |
| 8,082,061 B2 | 12/2011 | Segal et al. |

(Continued)

FOREIGN PATENT DOCUMENTS

WO    WO 2018154411 A2    8/2018

OTHER PUBLICATIONS

Wikipedia, "Artificial Neural Network," Jul. 25, 2019, 46-pages, https://en.wikipedia.org/wiki/Artificial_neural_network, San Francisco, CA.

(Continued)

*Primary Examiner* — Michael Collins
(74) *Attorney, Agent, or Firm* — Francis L. Conte

(57) ABSTRACT

A method of vending a product (n) in an automated vending machine (28) includes displaying an initial stock (S) of several products (n) on a display shelf (34), and identifying any product (13) removed therefrom by a customer (48) not by detecting the removed product (13) itself, but by comparing images (50,52) of the displayed stock (S) before and after product removal to determine any product (13) missing in the post-image (52) of remaining stock (S-(S-P)), and then charging payment for the missing product (13) to the customer (48).

22 Claims, 8 Drawing Sheets

(51) Int. Cl.
 *G06T 7/00* (2017.01)
 *G06K 9/46* (2006.01)

(56) References Cited

U.S. PATENT DOCUMENTS

| | | | |
|---|---|---|---|
| 10,001,402 | B1 | 6/2018 | Gyori et al. |
| 10,064,502 | B1 | 9/2018 | Gyori et al. |
| 10,332,066 | B1 | 6/2019 | Palaniappan et al. |
| 10,546,204 | B1* | 1/2020 | Kumar ............... G06K 9/00671 |
| 2004/0188455 | A1* | 9/2004 | Shioya .................. G07F 11/165 221/123 |
| 2008/0065538 | A1 | 3/2008 | Barcelou |
| 2010/0121482 | A1 | 5/2010 | Jackson et al. |
| 2010/0237091 | A1* | 9/2010 | Garson .................. G07F 9/026 221/226 |
| 2014/0316916 | A1 | 10/2014 | Hay |
| 2017/0103515 | A1* | 4/2017 | Hulth ................. G06K 9/00771 |
| 2017/0177969 | A1* | 6/2017 | Zaremski ............. G06K 9/4604 |
| 2017/0309136 | A1* | 10/2017 | Schoner ............... G07G 1/0045 |
| 2019/0050792 | A1* | 2/2019 | Kobayashi ............. G06Q 30/02 |
| 2019/0138986 | A1 | 5/2019 | Puerini et al. |
| 2019/0354923 | A1* | 11/2019 | Taira ....................... B60R 11/04 |
| 2020/0005231 | A1* | 1/2020 | Nakagawa .............. H04W 4/35 |
| 2020/0202177 | A1* | 6/2020 | Buibas .................. G06N 20/00 |

OTHER PUBLICATIONS

Ujjwalkarn, "An Intuitive Explanation of Convolutional Neural Networks," May 29, 2017, 18-pages, https://ujjwalkarn.me/2016/08/11/intuitive-explanation-convnets/, The Data Science Blog.

Girshick et al, Rich Feature Hierarchies for Accurate Object Detection and Semantic Segmentation, Tech Report (v5), Oct. 22, 2014, 23-pages, https://arxiv.org/abs/1311.2524, UC Berkely, CA.

Liu et al, "SSD: Single Shot Multibox Detector," Dec. 29, 2016, 18-pages, https://arxiv.org/abs/1512.02325, Ann Arbor, Michigan.

Wikipedia, "Binary Large Object," and "Blob Detection," May 6, 2019, 10-pages, https://en.wikipedia.org/wiki/Binary_large_object, San Francisco, CA.

Emami, S., "Color-Based Blob Detection," Dec. 27, 2010, 7-pages, http://www.shervinemami.info/blobs.html.

Woodford, C., "Neural Networks," Apr. 4, 2019, 10-pages, https://www.explainthatstuff.com/introduction-to-neural-networks.html.

Shridhar, K., "A Beginners Guide to Deep Learning," May 26, 2017, 18-pages, https://medium.com/@shridhar743/a-beginners-guide-to-deep-learning-5ee814c17706.

Schweikardt et al, "Automated Vision Through Artificial Intelligence," Jul. 29, 2019, 4-pages, https://www.auvisus.com/.

* cited by examiner

NEURAL VENDING MACHINE

BACKGROUND OF THE INVENTION

The present invention relates generally to automated vending machines, and more particularly, to passenger services in a commercial aircraft during flight.

With the constant change in passenger and flight economic dynamics, onboard catering and product services are seen as a revenue stream for an airline, while giving passengers selection and choice. However existing meal service and merchandising systems still rely on cabin crew and conventional trolley based distribution.

Automating meals and product or product sales in a passenger aircraft during flight present substantial challenges due to the many government regulatory requirements imposed on commercial aircraft to ensure passenger comfort and safety.

Aircraft vending services entail unique challenges including passenger interaction, payment, speed, usability, physical size, aircraft locations, F.A.A. Regulatory Certification, airworthiness, and weight, for example.

Commercially available vending machines would be prohibited in an aircraft primarily because they have not been designed to meet the various Regulatory requirements for safe aircraft operation, and in practice due to their fundamentally complex configurations, large size, excessive weight, and material compositions.

Typical vending machines are quite large and heavy and complex, and include numerous mechanical systems for displaying and selecting and accurately dispensing selected products to the customer or user, which are impractical for use in passenger aircraft, and therefore are not presently found therein.

Conventional vending machines typically require stocking of products in predetermined and preconfigured trays or slots or compartments or bins individually identified to ensure accurate dispensing of user-selected items, such beverage cans, food and snack items, and small product items, and thereby require complex mechanically driven dispensing chutes.

Products typically includes the ubiquitous universal barcode for identification, but vending equipment therefor would require corresponding barcode scanners and related equipment, all of which increase complexity and weight.

Products may also be fitted with the common Radio-Frequency Identification (RFID) tags which are relatively expensive, and yet again require corresponding scanning and related equipment which again increases complexity and weight.

A vending machine specifically tailored for aircraft use is nevertheless desirable and presents a compelling conceptual or design challenge, requiring novel solutions for use in a passenger aircraft in flight.

Self-service or automated vending machines are ubiquitous and well understood by customers, and therefore would be readily accepted by passengers during aircraft travel. A vending machine specially configured for aircraft use must quickly vend the product; must be small, compact, lightweight, and strategically located in the passenger cabin to reduce queues and passenger movement. The design challenge is to make such a product airworthy to offer a desirable solution for both the passengers and airlines.

The vending machine should be operable by passengers themselves, with secure billing of products removed therefrom, and with minimal crew assistance limited to restocking or resolving any malfunctions.

Accordingly, it is desired to provide a new and improved automated vending machine specifically designed for use in a commercial aircraft during flight.

BRIEF DESCRIPTION OF THE INVENTION

A method of dispensing a product in an automated dispensing machine includes displaying an initial stock of several products on a display shelf, and identifying any product removed therefrom by a user not by detecting the removed product itself, but by comparing images of the displayed stock before and after product removal to determine any product missing in the post-image of remaining stock, and then accounting the missing product to the user.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
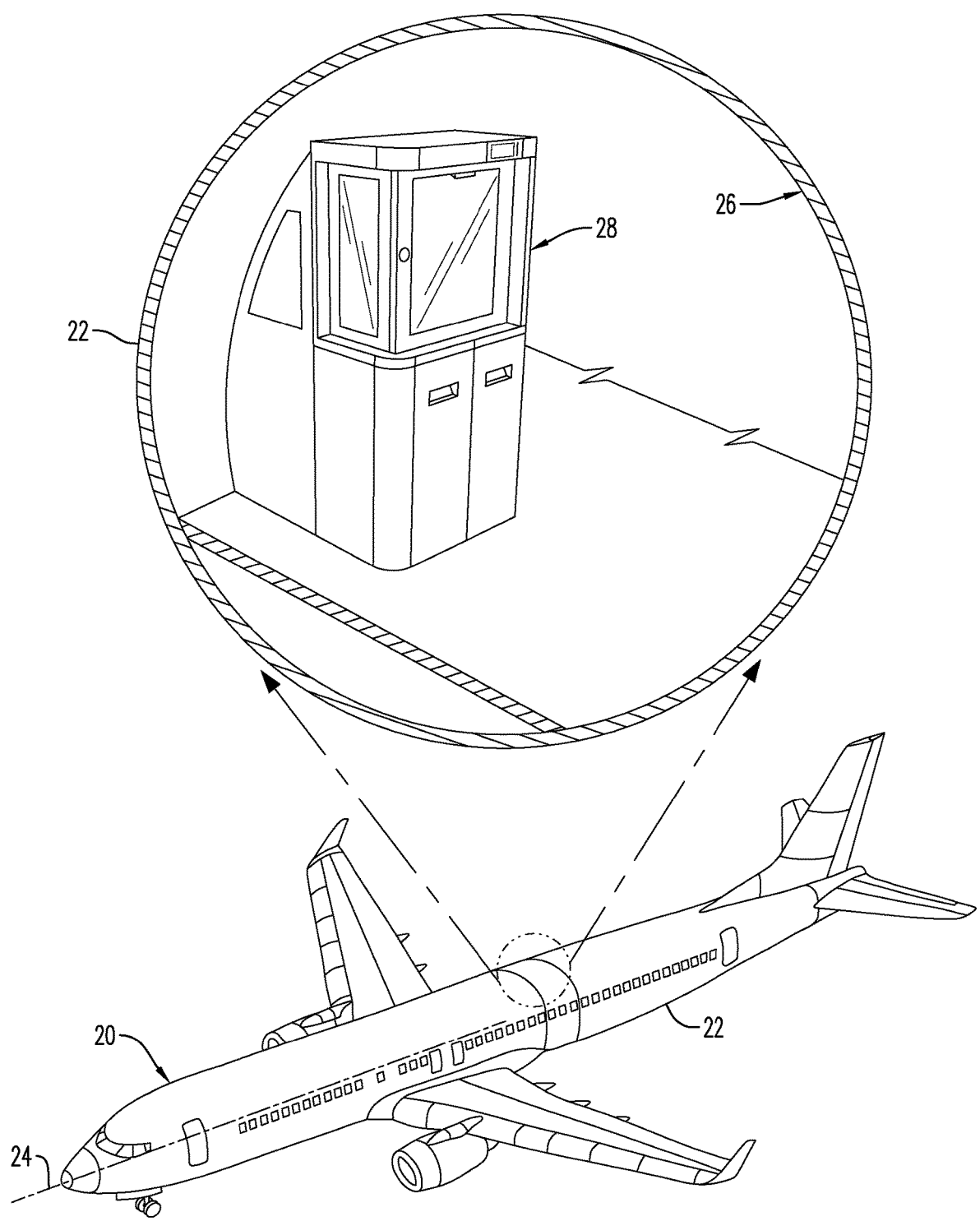
FIG. 1 is an isometric view of a passenger aircraft having a self-service automated vending machine (AVM) mounted inside the passenger cabin thereof.

Illustrated in FIG. 1 is an exemplary commercial passenger aircraft 20 having a cylindrical fuselage 22 and corresponding longitudinal or axial axis 24. The aircraft 20 is powered by twin turbofan engines mounted to the wings thereof for typical flight operation at altitude. The fuselage 22 includes an internal cabin 26 conventionally configured with rows of passenger seats (not shown), service galleys, and lavatories.

In accordance with the present invention, a self-service automated dispensing or vending machine (AVM) 28 is suitably mounted inside the cabin 26 at any convenient location for use by the passengers during flight. Additional AVMs may be distributed throughout the cabin as desired.

The AVM 28 is specially configured for use in the aircraft under applicable F.A.A. Government Regulations for meeting airworthiness and safety, and is additionally configured with minimal components having minimum weight for accurately and securely vending products to passengers during flight, by self-service without ordinary need for cabin crew assistance.

Figure 2:
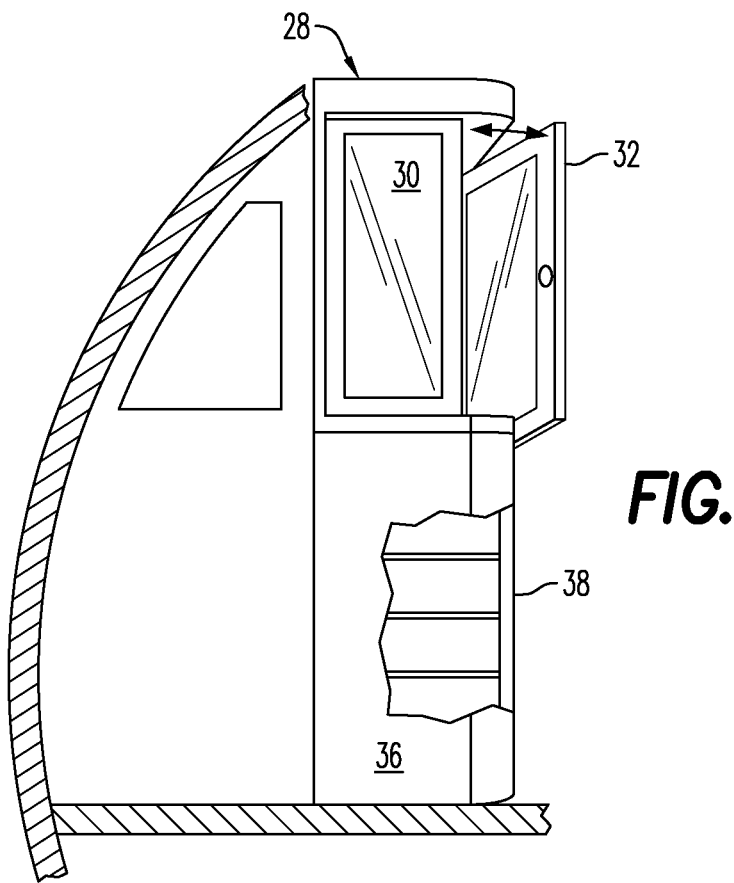
FIG. 2 is a side elevational view of the AVM shown in FIG. 1.
Figure 3:
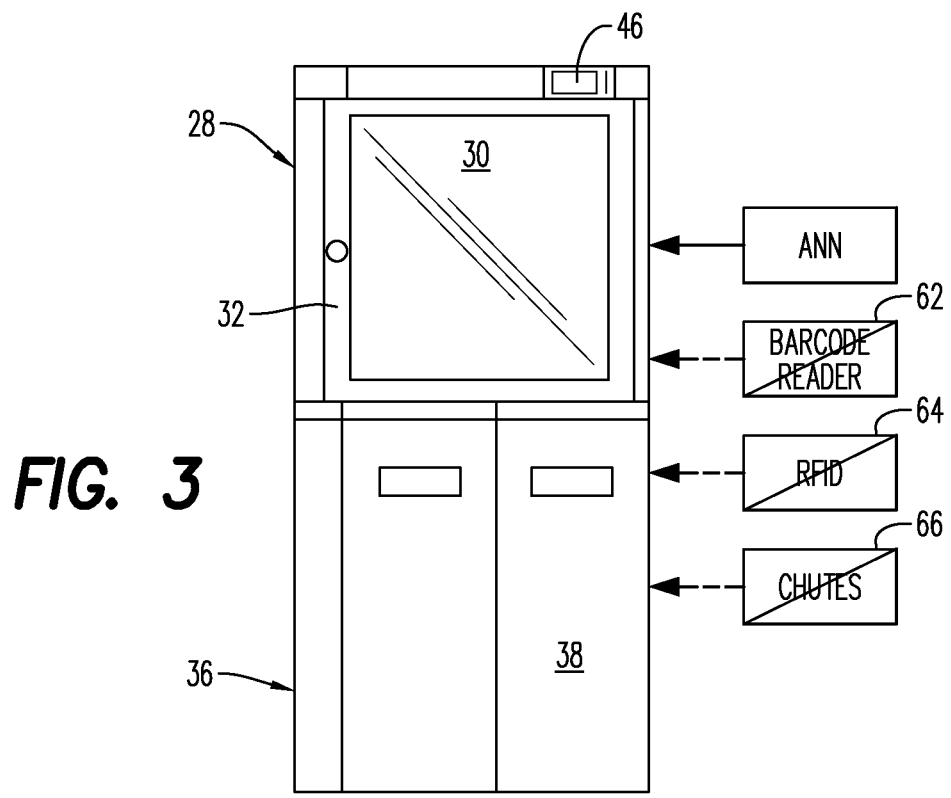
FIG. 3 is a front elevational view of the AVM shown in FIG. 1.
Figure 4:
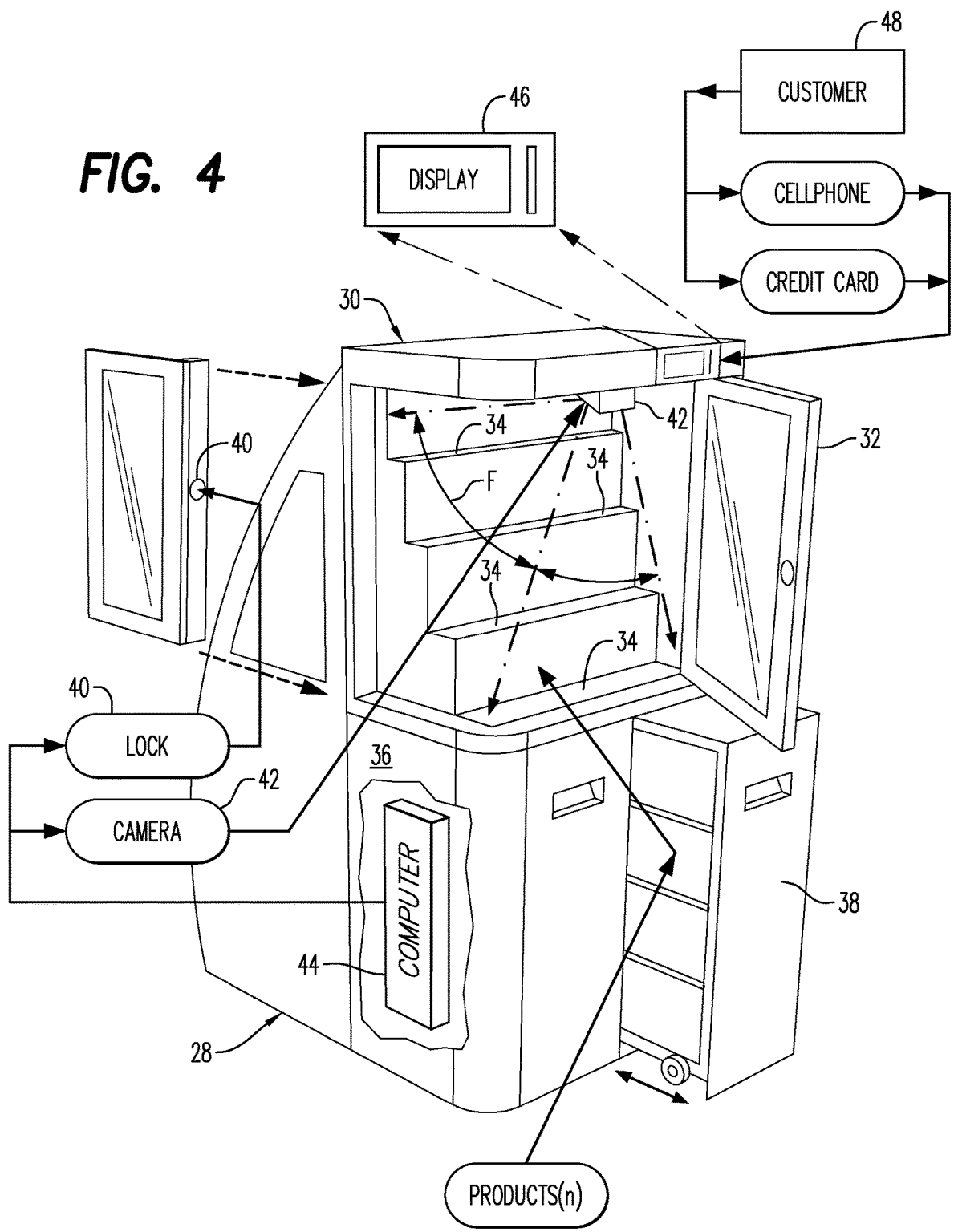
FIG. 4 is an exploded schematic view of the AVM shown in FIG. 1.

FIGS. 2, 3, and 4 illustrate side, front, and isometric views of the AVM 28 in an exemplary configuration mounted to the floor and curved fuselage inside the passenger cabin 26 for convenient access by the passengers. In addition to this stand-alone embodiment, galley and smaller wall-mounted configurations could also be used in the passenger cabin subject to available space.

In all aircraft configurations, the AVM 28 is configured to be lightweight, reliable, swift, and certifiable, for allowing onboard self-service vending of desired products. The aircraft configuration of the vending machine will use typical aerospace design features, materials and practices which are relatively simple to certify and meet applicable Government Regulations for operation in flight.

The AVM 28 shown in FIGS. 2-4 includes a suitably secure display cabinet 30 having a locked and transparent display door 32, and including multiple display shelves 34 for displaying through the door an initial, and limited, stock of merchandise or products (n) for sale.

Any number and type of products (n) may be offered for sale, such as food and beverages, or small retail products, with the total number of available products being selected by the airline, with each product P(n) being identified by its numerical value n ranging from 1, 2, 3, . . . N, where N represents the maximum number of potential products, and may have any suitable value like 10, 100, 500, and even 1000 or more as desired.

The display cabinet 30 in this stand-alone configuration may be mounted atop a base cabinet, or simply base, 36 preferably configured for housing two, or similar, conventional catering carts 38, in which may be stored any items required for aircraft services, including extra inventory or stock of the on-sale products (n). The cabinet 30 is specially configured for displaying a limited number or quantity (S) of products, and surplus and additional products may be conveniently stored in one or both carts 38. The carts 38 are suitably secured or locked into the base 36, and the display door 32 is locked to the cabinet 30 by a suitable electrically-activated door lock 40.

As initially shown in FIG. 4, the cabinet 30 includes an aerospace grade digital camera 42 preferably mounted inside the top of the cabinet with a field-of-view F extending both horizontally and vertically to specifically include all display shelves 34, and thereby simultaneously view the entire stock (S) of products (n) displayed on the several shelves 34. One or more cameras 42 may be used to ensure full viewing coverage of all products being displayed in the cabinet, from one or more different viewpoints as desired.

The horizontal display shelves 34 are preferably arranged in vertical tiers, four being shown for example, to best distribute the several products for unblocked viewing by the camera 42. It is preferred that each displayed product is separately viewable by the camera, without partial or complete blockage by adjacent products being displayed.

A digital computer 44 is suitably mounted inside the cabinet 30 or base 36 where space permits, and is operatively joined to the camera 42 and lock 40 for controlling operation of the AVM 28. In its simplest configuration, the AVM 28 is primarily a secure display cabinet 30, camera 42, and computer 44.

This camera based vision system avoids the need for complex and heavy mechanisms, which saves weight and renders less difficult aircraft certification. The AVM 28 can have almost any size, and can be configured to occupy minimal space inside the cabin, and needs minimal aircraft interfaces for communication and power. It includes a cashless electronic accounting and payment system, and product dispensing or vending will be monitored and controlled by a mechanism-less computer-based vision system specifically configured for aircraft use.

The digital computer 44 is specially configured in software for identifying any product removed from the cabinet by a user or customer not initially by identifying or detecting the removed product itself, but by comparing pre and post images taken by the camera 42 of the displayed stock before and after product removal to determine any product missing in the post-image of remaining stock, and thereby predict or infer which one or more products have been selected and removed by the user.

The computer 44 is joined to the electrical door lock 40 and configured to authorize access to a registered or authorized customer, and will unlock and re-lock the door before and after product removal, and then perform an accounting or attribution to the customer for the missing or selected product, and process payment therefor.

Customer access and communication may be provided by a suitable display panel 46 shown schematically in FIG. 4 which is operatively joined to the computer 44. Any user 48, such as the passenger or customer, may simply access the AVM 28 through the display panel 46, which may be conventionally configured with a credit card reader, a RFID sensor, and a Bluetooth system for registering or authorizing credit or payment from a credit card or cellphone payment app (application or software) presented by the customer 48.

Figure 5:
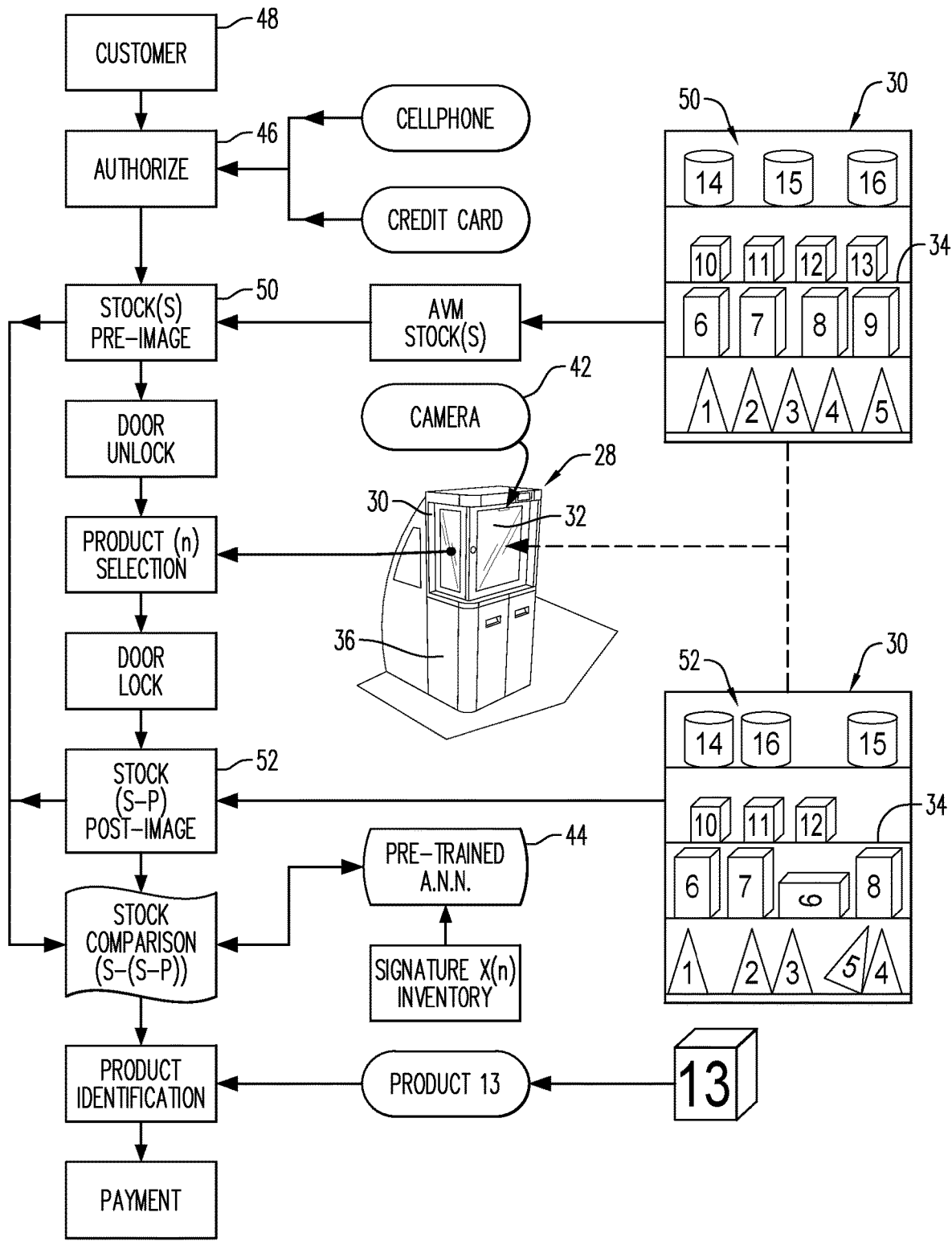
FIG. 5 is a flowchart showing operation of the AVM by a customer selecting and removing a product therefrom, with the removed product being identified by an Artificial Neural Network (ANN) trained for distinguishing differences in pre and post images of displayed stock.

As shown in FIG. 5, the basic method of dispensing or vending a product (n) to the aircraft passenger-customer 48 includes simply displaying an initial stock (S) of several products (n) on the display shelf 34, such as the multi-tiered display shelves locked inside the display cabinet 30 of the AVM 28. As indicated above, a full or master inventory (N) of products (n) will have a total number N of products as desired.

In FIG. 5, an exemplary merchandise layout distribution on the shelves 34 is shown, with the displayed stock (S(n)) including a total number S of sixteen, for example only, products (P(n)), which may be of any size and configuration which will fit in the available space of the cabinet 30 on the several shelves 34, such as the four exemplary shelves shown.

The product shelf layout may be generally random, but can be predetermined to promote certain product sales. The several shelves 34 allow any random location of product placement where space permits, and the products need not be confined to predetermined shelf locations or physically complementary seats thereon.

The initial display stock S(n) includes exemplary products 1, 2, 3, . . . 16, and n therefore includes 1-16, which initial stock products S(n) are illustrated schematically with different three-dimensional (3D) or physical shapes including cones 1-5 on the bottom or first shelf, tall rectangular boxes 6-9 on the second shelf, short rectangular boxes 10-13 on the third shelf, and cylindrical cans 14-16 on the fourth, or top shelf.

These sixteen products (n) may include duplicates or may all be different from each other as desired for sale, and the sixteen reference numbers 1-16 represent both the identification of the different products, and also the different graphics, text, color, barcodes, and all indicia presented or printed on the external surfaces of these products.

The number of products (n) ranges from 1 to N, and therefore each product (n) may be alternatively identified by its product number in the master inventory designated P(n), or its product number as displayed in the subset stock inventory designated as S(n), with the different appearance of each product being simply referenced herein by the product's reference numeral =1, 2, 3, . . . N.

For example, products 14-16 may represent different beverage cans by different manufacturers having different graphics patterns and color, like beverage can 14 be predominantly red in color with corresponding graphics and text, and beverage can 15 being predominantly blue in color with corresponding graphics and text.

Products 6-13 may represent exemplary food or retail products for sale, yet again by different manufacturers and having different graphics and color.

And, products 1-5 may represent exemplary additional items such as candy, other food items, or retail products for sale by different manufacturers and having different graphics and color.

In a preferred configuration of the tiered shelves 34 shown in front elevation view in FIG. 5, the entire stock (S) of products (n) displayed in the cabinet 30 are suitably spread apart horizontally and vertically without overlaps for providing full viewing by the camera 42 in the cabinet without obstruction by adjacent products. Each product may be suitably secured on the shelves 34 by corresponding retention seats, or adhesive, or VELCRO™ for the aircraft AVM application, but may simply rest by gravity on the shelves in land-based configurations having no movement of the AVM.

The AVM 28 is specially configured for identifying any product removed from a display shelf 34 by a customer not by detecting that removed product itself, but instead by comparing images of the displayed stock before and after the product is removed to determine any product missing in the image of the remaining stock. The customer 48 is then charged and pays for the missing product, which infers that such product has been selected and removed from the cabinet 30 by the customer.

This vending procedure is quite unlike the typical vending machine which requires that the selected product must be directly identified in some manner with corresponding equipment and complexity and weight.

The typical product barcode requires a corresponding barcode scanner to identify the product in making the purchase. An RFID tagged product similarly requires a scanner and equipment in making the purchase. Such barcode and RFID product identification is undesirable in an aircraft AVM due to their complexity and weight, and would typically require cabin crew supervision; and therefore are not readily conducive to self-service and secure operation.

The AVM 28 shown in FIG. 5 has remarkably few components and uses the camera 42 for imaging the displayed stock before and after the product is removed from the cabinet 30 by the customer 48. The computer 44 is specially configured for identifying from camera-imaging all products in both the initial stock before product removal and in the remaining stock after product removal.

Note that the initial display stock (S) includes all products 1-16, and the customer 48 has taken or removed, for example, only a single product, such as product 13, which leaves the fifteen products 1-12 and 14-16 in the remaining stock (S-(S-P)).

The computer 44 then compares the products identified in the initial and remaining stocks to determine any missing product therebetween, such as the exemplary product 13, and thereby infers and designates that missing product 13 as the removed or customer-selected product.

The camera 42 is preferably operated by the computer 44 for pre-imaging the initial stock (S) of products (n) before product removal, and then identifying the initial stock of products from that pre-image 50, and then post-imaging the remaining stock of products after product removal, and identifying the remaining stock of products from that post-image 52. By then comparing the so identified remaining stock and the so identified initial stock, any missing product can be identified and accounted for.

In FIG. 5, the stock (S) pre-image 50 is shown schematically as the elevational front view of all sixteen displayed products 1-16, and the post-image 52 is shown schematically as the similar elevational front view of the remaining fifteen displayed products 1-12 and 14-16.

Schematically in FIG. 5, the initial stock (S) has 16 products, and product P(13) is removed leaving (S-P), or 15 products remaining on display. The comparison of the pre and post images 50,52 corresponds with (S-(S-P)) which results in P being the removed product, such as the single product 13 in the example shown in FIG. 5.

If two products 13 and 7, for example are removed from the cabinet 30, the comparison (S-(S-P)) will result in identifying those missing products 13 and 7 as having been removed and now missing.

Note that the post-image 52 shows that the customer has handled several of the displayed stock products (n) and rearranged some of them before finally selecting and removing exemplary product 13. This ability by the customer to simply view and touch and examine and even return any product back to the display cabinet 30, irrespective of its original shelf location, shows the great versatility and vending simplicity of the AVM 28.

The initial stock of products (n) may therefore be simply displayed randomly or in desired layout or pattern on one or more of the display shelves 34 in the locked display cabinet 30 for initial viewing by customers 48 through the transparent display door 32. And, the customer has the ability to randomly rearrange the product layout in the cabinet as the products may be manually held and examined.

The customer 48 then presents a credit card or cellphone with Bluetooth or RFID payment App(lication) to the display panel 46, or suitably marked communication area, for authorizing access to purchase from the cabinet 30. The computer 44 operates the camera 42 to take the pre-image 50 of the initial stock (S) on display, and then suitably identifies from that pre-image 50 each and every product (n) in that initial stock before unlocking the cabinet 30.

The computer 44 then unlocks the cabinet door 32 to allow access by the customer to all products displayed inside the cabinet, any one or more of which may be manually handled and removed by the customer for inspection and purchase, or returned to the cabinet if not desired.

The customer simply closes the display door 32 when finished inspecting products, and the computer 44 then locks the door, and again operates the camera 42 to take the post-image 52, and then suitably identify from that post-image the remaining stock of products after any product has been removed by said customer, or not.

The computer 44 is specially configured to compare the pre-image 50 and post-image 52 for matching products found and identified in both images, and determining if any product is missing from the post-image 52.

In FIG. 5, the pre-image 50 contains all sixteen initial stock (S) products 1-16 identified by the computer, and the post-image 52 contains only fifteen (S-P) products 1-12 and 14-16 again identified by the computer. Comparing these results (S-(S-P)) shows that product 13 (P(13)) is missing from the post-image 52.

Product 13 is thereby identified by inference since it is missing from the display stock, and the vending process is completed by charging payment to the customer for the so-identified missing product (13).

The AVM 28 relies fundamentally on its vision or optical camera 42 and the associated computer 44 specifically programmed in software to take the pre and post images of product stock, and suitably analyze those images to identify the products (n) captured therein and thereby determine if any product is missing in the post-image after the customer closes the display door.

Since the customer may manually remove and inspect any displayed product (n) and randomly return them to the cabinet in either the original location or different locations, visual identification of the displayed stock must be performed both before and after such customer intervention. It is possible that no product is selected and removed by the customer, and therefore the customer should not be charged for any product not removed from the cabinet or for any product merely re-arranged inside the cabinet.

Accordingly, the computer 44 is specially configured to operate the camera 42 to make accurate images of the product stock before the display door is unlocked and opened by the customer, and after the door is re-closed and re-locked; and then accurately detect and recognize each and every product (n) contained in the pre-image 50 and post-image 52 irrespective of location and orientation on the display shelves 34.

Accurate recognition from the stock images ensures accurate identification of all displayed products, and accurate inference of any product removed by the customer for accurate accounting and proper billing therefor.

This procedure also provides enhanced security in vending the products since it relies on identification of all product inventory or stock displayed in the cabinet 30, and does not require direct identification of any product actually removed by the customer.

Compare typical self-service checkout systems in which the customer is honor-bound to self-scan individual products past the typical barcode scanner to identify the product and tabulate that product in the resulting invoice. Of course, failure to scan any item means that such item will not be tabulated, nor paid for; and, quite significantly, such self-scanning correspondingly requires barcode scanner equipment. In the limited environment of an aircraft, self-service equipment, like the barcode scanner is not practical, nor sufficiently secure without operation by cabin crew.

The AVM 28 introduced above therefore provides significant advantages in few components, little weight, and relative simplicity for providing accurate identification of a selected product and secure self-service vending thereof in a passenger aircraft configuration, for example only.

Accurate identification of the stock products (n) can be provided in the AVM 28 by deploying in the computer 44 an Artificial Neural Network (A.N.N. or simply ANN) trained to both detect and recognize each product (n) in both the stock pre-image 50 and in the stock post-image 52.

Artificial Neural Networks are conventionally known computing systems inspired by biological neural networks that can be trained to perform various tasks by considering examples, generally without being programmed with any task-specific rules.

In one Wikipedia reference, for example, an ANN may be trained for image recognition, and can identify images that contain objects, such as a cat. In the training stage, a multitude of example or training images are manually labeled as cat or no-cat and analyzed and then used to identify cats in other images.

The ANN does this without any prior knowledge about cats, for example, that they have fur, tails, whiskers, and cat-like faces. Instead, the ANN automatically generates identifying characteristics from the learning material that they process, and after suitable training develops a corresponding heuristic or neural signature for each object, like the cat.

ANNs have been used on a variety of tasks including computer vision, speech recognition, machine translations, social network filtering, playing board and video games, and medical diagnosis, for examples.

In the AVM 28, the ANN deployed in the computer 44 is specially configured to use computer vision and analyze the pre-image 50 and post-image 52 for detecting and recognizing the stock product images captured therein. Note, in particular, that the ANN is not being configured to directly image and identify the actual product (13) being removed from the display cabinet 30, but, instead is imaging the pre- and post-stock to predict or infer missing products as described above, and further described hereinbelow.

The ANN deployed in the computer 44 is trained to both detect and recognize each product in the stock pre-image 50, as well as in the stock post-image 52; and the computer 44 then compares the ANN-recognized stock product images between the post-image 52 and the pre-image 50 to identify any missing product, like product 13.

As deployed in the AVM 28 in FIG. 5, the ANN is already trained, or pre-trained, for use in accurately detecting and recognizing the several products (n) captured in the pre-image 50 and post-image 52. In this way, the automated vending machine 28 is specially configured as an artificial neural network vending machine, or simply Neural Vending Machine, which relies on computer vision to image the stock products, and detect and recognize from that image the various objects or products captured therein.

Figure 6:
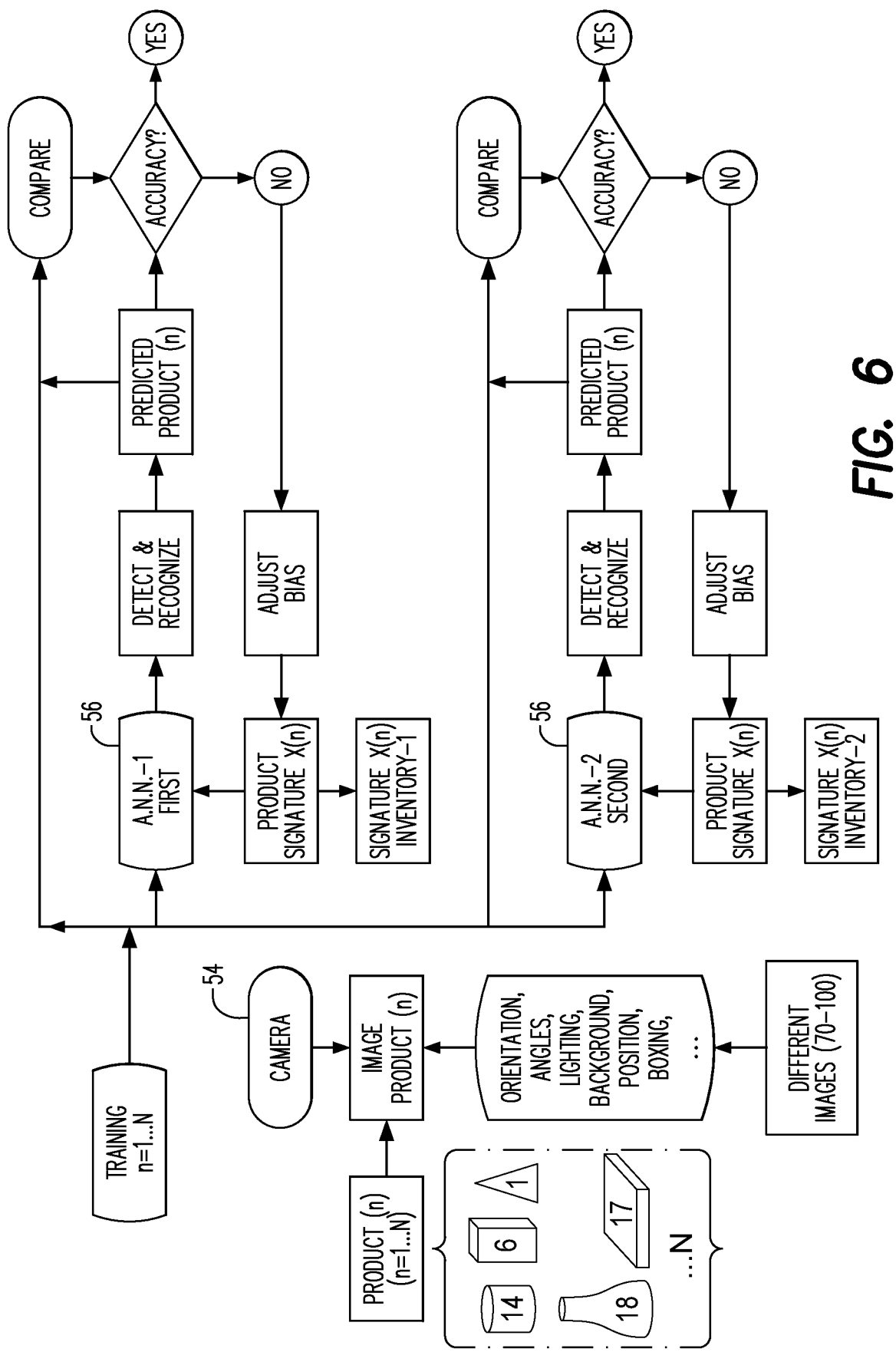
FIG. 6 is a flowchart showing pre-training of the ANN shown in the AVM of FIG. 5.

FIG. 6 illustrates schematically how the ANN is trained in an otherwise conventional process, except as specially modified for use in the AVM 28. FIG. 6 shows similar training for two different ANNs, a first ANN-1 and a second ANN-2, for use in the AVM 28, as described in more detail hereinbelow.

Both first ANN-1 and second ANN-2 are pre-trained prior to use in vending the products to accurately identify each of the numerous products (N) in the master inventory thereof. Each product (n) is initially captured by the camera 42 from suitable angles to provide a unique identification thereof based on physical configuration, size, and/or geometry thereof, including appearance and color or any suitable physical attribute. For example, two identically sized cans of beverages might be identified and distinguished by the color and pattern of the distinctive labels thereof.

The results of product identification training are then used in the AVM 28 for providing an accurate database of a suitably large product inventory (N) from which the subset stock (S) products (n) displayed for sale in the AVM can be authenticated for sale to the passenger.

Conventional pre-training includes first imaging the desired master inventory of a multitude of products (n) including the initial product stock (S). As indicated above the master inventory of products (n) from which the display stock (S) is selected can be as large and varied as desired, where N represents the maximum number of potential products, and may have any suitable value like 10, 100, 500, and even 1000 or more as desired.

Each product (n) has a physical and three-dimensional (3D) configuration, and will have corresponding graphics, text, color schemes, and barcodes printed on the outer surface thereof, and schematically referenced by the product numbers 1, 2, 3, . . . 18 . . . N shown in FIG. 6.

The products (n) being trained are actual products for subsequent use in the intended AVM 28. The stock (S) displayed in the AVM is a suitable subset of the master inventory (N), and includes for example, products 1-16 as shown in the FIG. 5 example.

A suitable training camera 54 is operatively joined to another, typically main-frame, computer 56, and multiple training images are taken of each product (n) which undergoes learning or training in the two ANNs.

Each training image may include one or more products, suitably spaced apart for manual boxing or framing by the training technician to ensure complete imaging thereof, and multiple images of each product are taken with different orientations, angles, lighting, background, position, boxing, etc., as desired.

For example, initially trained products may require 500 to 1000 images each for training the ANNs for accurate detection and recognition thereof. Subsequently trained products may then only require about 70 to 100 different images for accurate training of the ANNs.

As indicated above, ANNs in general are conventional, as well as the training thereof. Each ANN is configured to analyze each product training image and both detect products therein and recognize those products, with a prediction of the product analyzed.

At first, the product predicted by the untrained-ANN will be incorrect in the training process, when compared with the actual product contained in the training image, and then corresponding weights or biases are adjusted in the ANN model, which is run again for the next prediction. This iterative process is repeated for a multitude of iterations or epochs until the ANN is suitably trained and learns the corresponding neural signature X(n) for each product (n).

As indicated above, conventional ANNs automatically generate identifying characteristics from the learning material that they process, which characteristics are mathematical abstractions, but nevertheless represent a product or neural signature X(n) understood by the ANN for accurately detecting and recognizing each product.

The training process continues product-by-product until all products (n) can be accurately detected and recognized from an image thereof based on a correspondingly developed neural signature X(n), and the corresponding neural signature for each product is stored for later use in the AVM in a suitable signature inventory or database for all products (n).

During one development program to detect and recognize six test objects, one million training iterations or epochs were performed requiring six full twenty-four hour days of computer time to develop a 12th generation ANN with sufficient accuracy to identify those six test objects from corresponding images thereof, and thereby support proof-of-concept.

As indicated above, two ANNs are similarly trained in the FIG. 6 flowchart, and FIG. 5 illustrates schematically one or more such pre-trained ANNs deployed in the AVM computer 44.

For best product identification, the same pre-trained ANN is used to detect and recognize the products (n) in both the pre-image 50 and post-image 52 in the AVM 28 shown in FIG. 5. Correspondingly, the AVM camera 42 should be the same or similar to the training camera 54, with suitable optical and digital performance to ensure best matching of the detected neural product signatures X(n) from the images and the learned signature inventory or database.

Whereas the training computer 56 shown in FIG. 6 is preferably a main-frame computer with enhanced computational ability for training the ANN, the AVM computer 44 shown in FIG. 5 can be substantially smaller in size and computational processing performance for adequate use in deploying the trained ANN for product identification.

Figure 7:
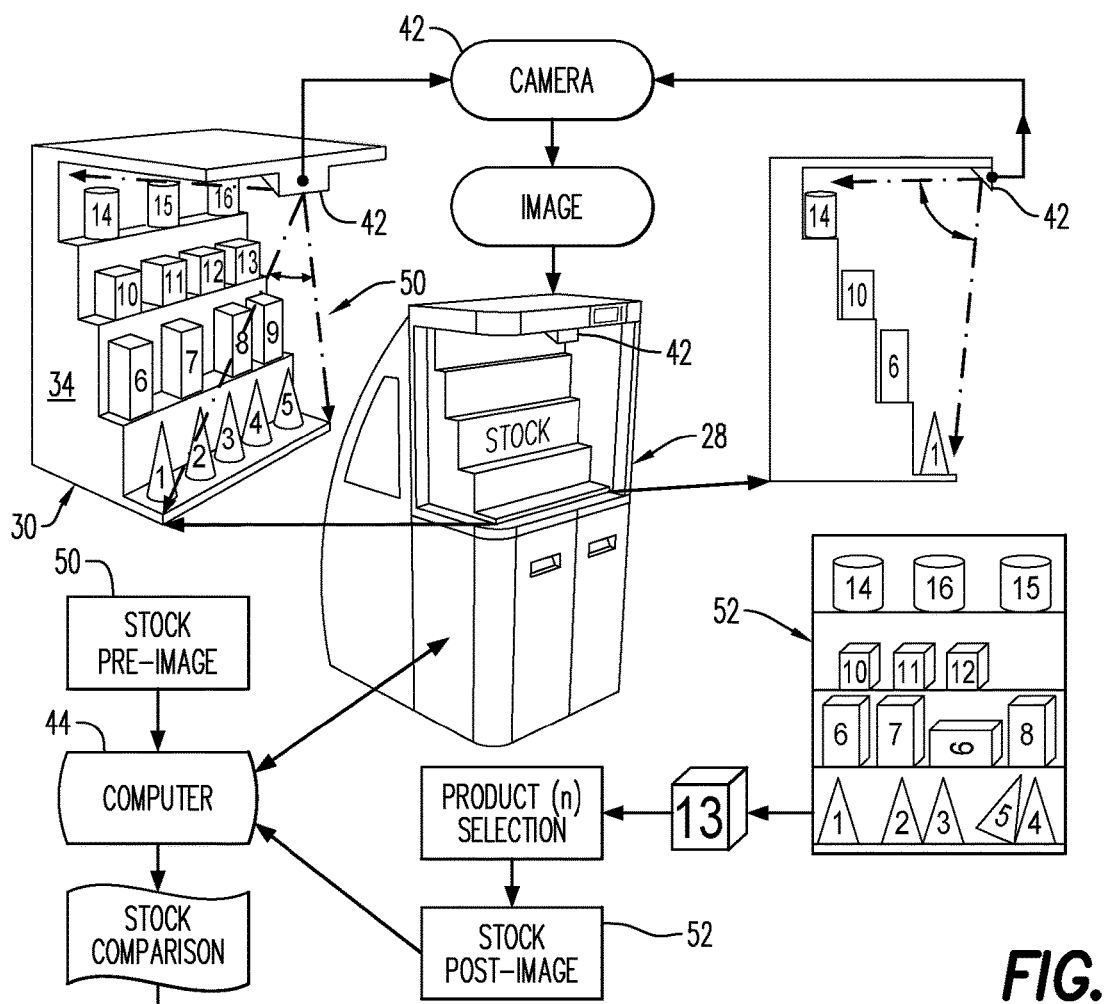
FIG. 7 is a flowchart of the AVM shown in FIG. 5 configured with different ANNs for identifying the removed product as the product missing in the post-image.
Figure 7:
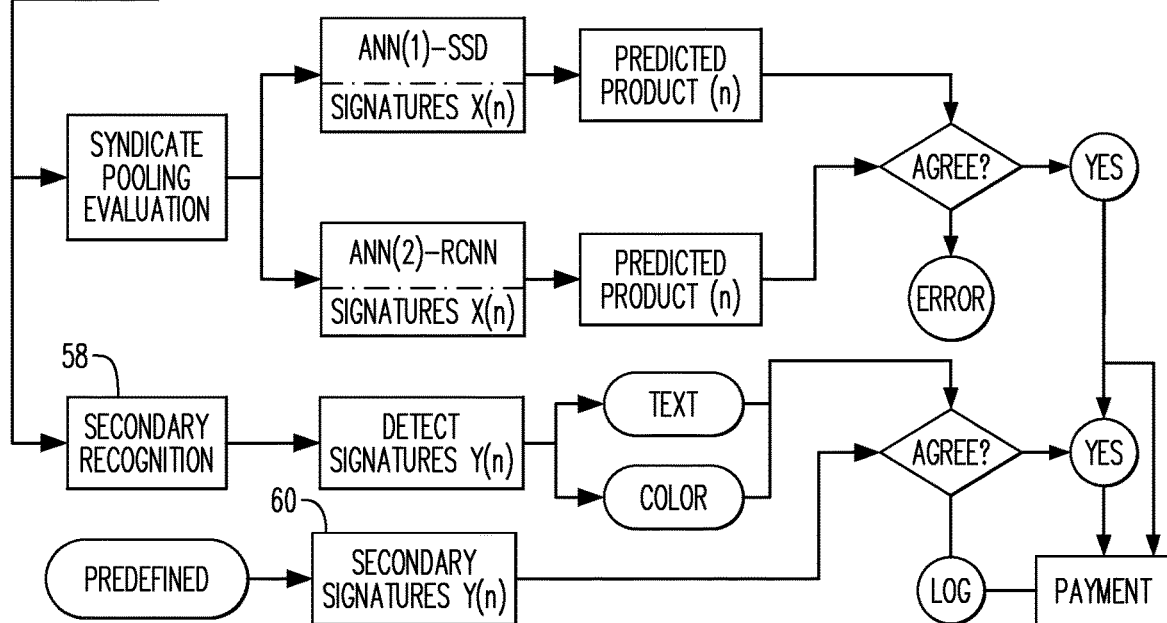

FIG. 7 illustrates a preferred configuration of the AVM 28 shown in FIG. 5 in which the computer 44 is configured in software to include two different ANNs including a first Artificial Neural Network (ANN-1) pre-trained to both detect and recognize each product (n) in the stock images, and a second Artificial Neural Network (ANN-2) differently configured than the first ANN-1, and pre-trained to both detect and recognize each product in the same stock images.

The first ANN-1 has its own trained first database or inventory-1 of neural signatures X(n), and the second ANN-2 has its own trained second database or inventory-2 of neural signatures X(n), which will be different than the signatures in the first ANN-1.

The two different ANNs are deployed in parallel in syndicate pooling evaluation (SPE) to independently detect and recognize the products in both the pre-image 50 and post-image 52. The first ANN-1 is used to detect and recognize the products in the pre-image 50 and post-image 52, with suitable accuracy or error threshold; and the second ANN-2 is used in parallel to detect and recognize the products in the same pre-image 50 and same post-image 52, with suitable accuracy or error threshold.

Both ANNs will then predict all products (n) in those pre and post images, with the computer software being specially configured for comparing such ANN-recognized stock products (n) between the post-image 52 and the pre-image 50. The product recognition by the first and second ANNs must agree to improve accuracy of product identification, and if the predicted products (n) found in the images do not agree, the AVM 28 will report an Error on the display panel 46, and then require cabin crew intervention.

Agreement between the two ANN product predictions ensures more accurate identification of the removed or missing product in the post-image 52, and allows the purchase transaction to be completed, with payment charged to the customer.

Two different ANNs are preferred in the AVM 28 to exploit the corresponding advantages of different ANN models or technology, with correspondingly different neural signatures X(n). Many types of conventional ANNs are known and vary significantly in performance.

For the AVM 28, it is desirable to have two different ANNs having different approaches to detection and recognition. Since product identification depends on analysis of the product images, each image must first be analyzed to detect different objects or products therein. Upon object detection, the objects must also be suitably recognized.

In the exemplary product stock (S) pre-image 50 shown in FIGS. 5 and 7, the sixteen displayed products (n) have different configurations and shapes and appearances, and the ANNs must first detect and differentiate between the sixteen products found in the pre-image 50; and then the ANNs must recognize each of those sixteen products (n) based on the extensive training of the ANNs, and corresponding neural signatures X(n).

By incorporating two very different ANNs in the neural AVM 28, accuracy of product identification can be substantially improved by requiring agreement between the two ANNs in identifying each product (n), or else the vending transaction will end in an error, thusly requiring cabin crew intervention.

One suitable type of conventional ANN is the Convolutional Neural Network (CNN or ConvNet) configured for image recognition and classification. CNNs have been successful in identifying faces, objects, and traffic signs for powering vision systems in robots and self-driving cars.

Another suitable type of conventional ANN is the Region-based Convolutional Neural Network (RCNN) providing state-of-the-art visual object detection using a CNN having target regions to assess using selective search sliding windows. An exemplary RCNN is disclosed in arVix paper 1311.2524 available online from arXiv.org, submitted on 11 Nov. 2013 (v1) and last revised on 22 Oct. 2014 (v5).

Another suitable type of conventional ANN is the Single Shot Detector (SSD) in which a CNN operates on an input image only once and calculates a feature map. An exemplary SSD in the form of a single shot multibox detector is disclosed in arVix paper 1512.02325 available online from arXiv.org, submitted on 8 Dec. 2015 (v1) and last revised on 29 Dec. 2016 (v5).

A small 3×3 sized convolutional kernel on this feature map is used to predict the bounding boxes and classification probability. SSD also uses anchor boxes at various aspect ratio similar to RCNN. In order to handle the scale, SSD predicts bounding boxes after multiple convolutional layers. Since each convolutional layer operates at a different scale, it is able to detect objects of various scales.

In the AVM 28 shown in FIG. 7, the two different ANNs preferably include the first ANN-1 in the form of a Single Shot Detector (SSD), and the second ANN-2 in the form of a Region-based Convolutional Neural Network (RCNN).

The aim of this selection is to have two very different networks that have different approaches to detection and recognition. The RCNN is typically larger in features and more intensive, and thereby slower in performance, which results in improved recognition capability. The SSD is typically smaller in features, and correspondingly faster in performance, and has more generous detection thresholds.

The two different ANNs are then combined in the AVM 28 to collectively effect Syndicate Pooling Evaluation in which each network, SSD and RCNN, operate in parallel on the same pre-image 50 and same post-image 52 to independently predict which products (n) are recognized therein, and those predictions are then pooled together and evaluated by comparison so that only agreement in predictions for product-to-product for the stock (S) of products captured in the images will permit inference and identification of any product missing from the post-image 52.

If such pooling of predictions agrees, the missing product is more accurately inferred, and the vending transaction is permitted to complete by charging payment to the customer.

If such pooling does not agree for any of the product images, then an error result is sent to the display panel 46 to require cabin crew intervention.

Further accuracy in identifying the missing product 13 shown in FIG. 7 may be optionally effected by deploying in the computer 44 a Secondary Visual Recognition System (SVRS) 58 in additional software or algorithms to identify from a suitable secondary signature Y(n) each product (n) in both the stock pre-image 50 and in the stock post-image 52.

FIG. 6 shows the master inventory or multitude of products (N) including the initial product stock (S) being displayed in the AVM cabinet 30 in FIG. 7.

As shown in FIG. 7, a secondary signature Y(n) may be suitably defined for each product (n) in the master inventory (N) based on actual product appearance, not just the heuristic approach used to train the ANNs for establishing the different neural product signatures X(n).

Each product (n) has a suitable configuration, including 3D physical shape and size, with different graphics, text, color, barcodes, and other indicia presented or printed on the external surfaces thereof.

Any suitable physical appearance feature of the products may be selected and extracted from the training images for use as the secondary signature Y(n) stored in a suitable database 60 of secondary signatures Y(n) in the AVM computer 44.

Then an additional comparison may be made by the computer 44 of the stock pre-image 50 and the stock post-image 52 to identify the missing product (13) based on the secondary signature Y(n) thereof, in addition to the SPE comparison provided independently by the two ANNs using the neural signatures X(n).

For example, the secondary signature Y(n) may be a color signature of the products (n), and the SVRS 58 can be configured in suitable software algorithms to include conventional Binary Large Object (BLOB) detection of the color signatures Y(n).

In another example, the secondary signature Y(n) could be the text or label printed on the products, and the SVRS 58 would then include conventional Optical Character Recognition (OCR) software or algorithms for recognizing the text signature Y(n).

In either configuration, a secondary evaluation of the pre-image 50 and post-image 52 based on physical appearance of the products captured therein may be used to suitably identify those products in another evaluation parallel with the neural-based SPE evaluation provided by the two ANNs.

Primary identification of the missing product (13) is effected by the two SPE-ANNs which must agree with each other (YES) in order to authorize and complete the vending transaction, and charge payment to the customer.

If the SVRS identification of the missing product (13) is also successful (YES), the vending transaction is still authorized, but with additional certainty in identifying the removed product (13). If the SVRS identification does not identify the missing product (13), an error will simply be recorded or logged, and the transaction still authorized based on the single (YES) agreement of the two SPE-ANNs.

After an initial vending transaction with one customer, another customer may access the AVM 28 and repeat the vending transaction described above. As noted above for FIGS. 5 and 7, the previous customer may have purchased product 13, for example, which is now missing in the displayed stock (S-P13). Furthermore, that previous customer may have rearranged the displayed products as shown in the post-image 52.

If the cabin crew services or restocks the AVM 28, the cabinet may be restored to the original full display stock (S) of products 1-16 in either the original layout or in a different reorganized layout. If the cabin crew does not service the AVM 28 after the previous sale, the displayed stock (S-P13) will remain in the arrangement shown in the post-image 52.

When the next customer begins the vending transaction, the resulting pre-image 50 may be taken anew by the camera 42 and will then match the previous post-image 52, and a new post-image (52) will be taken by the camera to determine which, if any, products have been removed from the display cabinet 30 for purchase by that next customer.

This vending process will continue until the displayed stock is exhausted or diminished, or the aircraft flight terminated, with each successive vending transaction following the ANN-based visual detection and recognition described above for identifying any product removed or missing from each post-image 52 taken by the camera 42.

Although the AVM 28 can be configured for use in any suitable environment, including land-based, the special ANN-based configuration thereof makes it particularly useful and beneficial in aircraft applications, which initially require F.A.A. government compliance for airworthiness, and should be light-weight, and provide secure self-service by individual customers, without the need for cabin crew operation or supervision, except under error or malfunction conditions, or for restocking.

Accordingly, the AVM 28 may be conveniently mounted to the aircraft fuselage 22 as shown in FIGS. 1 and 2 at any suitable location inside the passenger cabin 26, with the display cabinet 30 being readily accessible to passengers during flight. As indicated above, the display cabinet 30 itself may have various configurations for suitable distribution inside the passenger cabin where space permits.

The aircraft-configured AVM 28 may have minimal complexity and weight as characterized by the express absence of conventional systems for directly identifying and automatically dispensing any product from the display cabinet, including barcode readers 62, Radio-Frequency Identification (RFID) detectors 64, and mechanically-driven dispensing chutes 66, as illustrated schematically in FIG. 3 as not necessary and not provided in the AVM 28.

Most conventional automated vending equipment is therefore not required for operation, with the basic configuration needing only the locked display cabinet 30 with suitable shelves 34 for displaying the stock (S) of products (n), and the camera 42 suitably mounted inside the cabinet 30 and operatively joined to the computer 44, which is pre-programmed in software to operate all functions of the AVM 28, including artificial neural network identification of any product selected by a customer and removed from the cabinet 30 for automated purchase.

Figure 8:
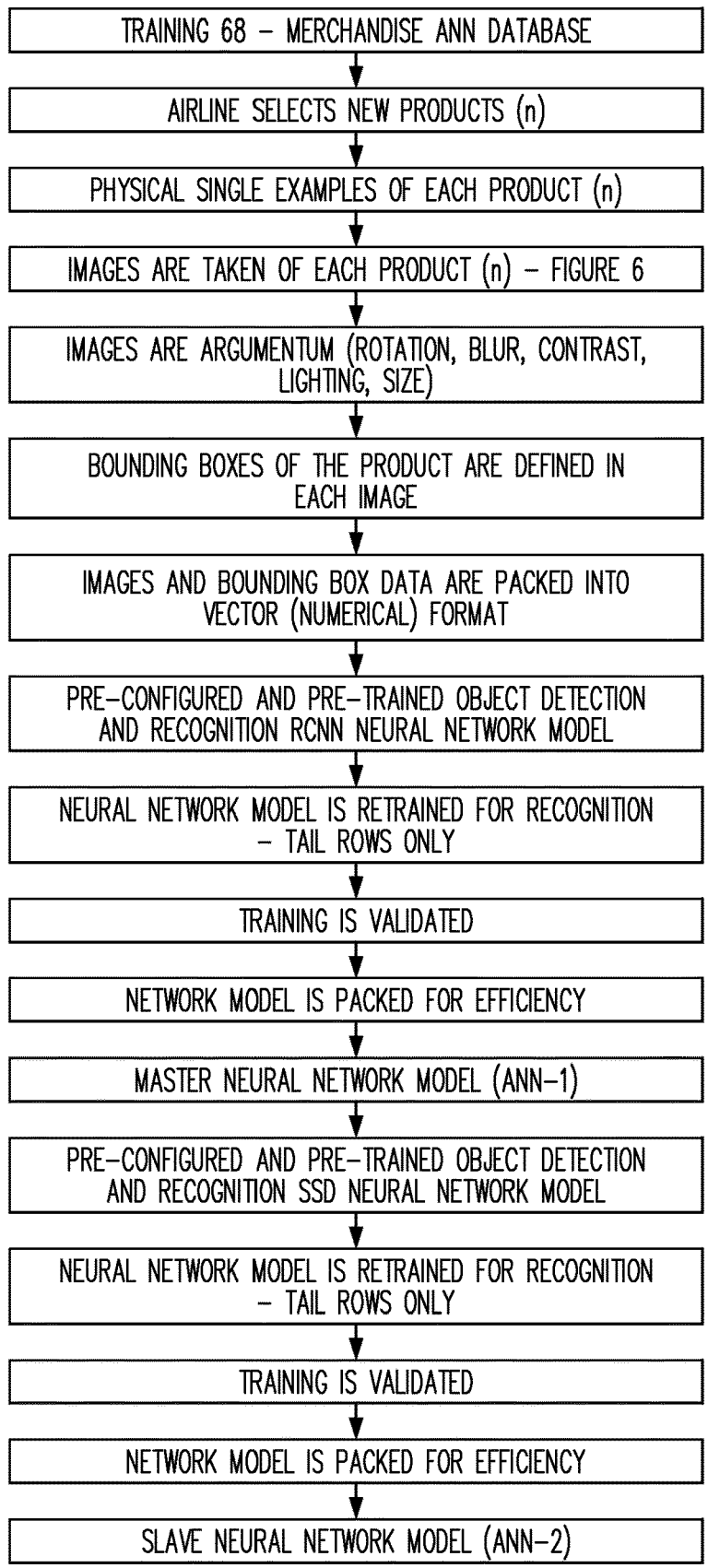
FIG. 8 is a flowchart showing training of the different ANNs for use in the AVM shown in FIG. 5.

FIG. 8 presents a more detailed training flowchart 68 in which a particular airline will select desired merchandise or products for sale in the AVM 28, and the first or master ANN-1 and the slave or second ANN-2 are suitably trained to develop corresponding heuristic or neural signatures $X(n)$ for each product (n) for subsequent deployment in the AVM 28.

ANN training is conventional, but development testing for use in the aircraft AVM 28 suggests certain improvements specific thereto. Training provides the neural network with each product image and a bounding box indicating the product-object and its type, the network then repeatedly looks at all the training images and adjusts its internal attributes to converge toward an optimized solution.

A new product (n) may be added by taking static images in a controlled environment emulating the AVM, and at different angles and distances of product. The images may then be packed and converted into a numerical format to allow the neural network to be trained.

ANN training parameters may include: selection of suitable preconfigured artificial neural network; convergence robustness of the network to avoid over fitting; selection of desired products (n); three Stock Keeping Units (SKU) three at time; one or more products (n) per training image; 70, 100, 200, 300, 600, 1000, or more training images; large or small recognition bounding boxes and grounded truth; aligned and/or unaligned bounding boxes; and training image quality.

Although initially trained products may require 500 or more training images each, subsequently trained products may require fewer training images, like 70 to 100 for accurate training of the ANNs.

The system needs to be visually trained to recognize new items of merchandise and therefore the merchandise needs to be visually different to allow classification. Items that look similar, will be classified the same. This may or may not cause an operational concern as it really only effects pricing and absolute inventory control strategies.

Transfer learning is preferably used to reduce the number of required images. Transfer learning retrains a pre-trained ANN to classify a new set of images. Without transfer learning an empty network would need 1000's of images to train to a useful accuracy.

During the training stage each image must be manually annotated by the trainer to tell the computer what object or product each training image contains, and where in the image each object it is located. A labelled bounding box is created by the trainer. This raw image is then provided to the network being trained which estimates the result. An error value is provided on how well the network guesses the image content.

At the beginning of training the error is very high as the network guesses; and the aim of the learning algorithm is to reduce the error object recognition by optimizing the weight or bias values on each neuron in the network.

Experimental development of one ANN suggests that a minimum of 70 to 100 images may be used to produce accurate and reliable results for a new merchandise item to correctly detect and recognize a product (n).

The specific network being trained will extract heuristic features or attributes during the training stage. Therefore more images, and more varied images (in terms of position, lighting, orientation, etc.) allows the network training to extract high-level, higher quality features in developing the neural signature $X(n)$ for the specific product (n). Like the human brain, identification features start low level, such as shape, color, and size, and become higher level and more abstract, like a face, a head, a body, etc., with better feature training achieving better object or product recognition. Only the recognition stage of the ANN needs re-training when new merchandise is added. Training requires only one physical piece of the actual merchandise.

Images are then taken in a controlled environment of background, lighting, camera, angle, etc., at various angles, and merchandise position. These images are preferably taken at maximum camera resolution. 70 to 100 visually quantifiable different images of each product (n) are normally required after training a few initial products, which require substantially more training images.

The training images can contain either single or different items of merchandise using suitable bounding boxes applied manually by the operator or technician to highlight or designate each product (n). That is, the user must define the largest bounding box, since the detection stage of the ANN is not being re-trained, for each piece of merchandise on each image. The training images together with user-annotation provides the grounded truth in a data set which is used to train the ANN. The actual training process is a numerical solving iterative convergence process. This takes a lot of processing power, which can be done locally, or pushed onto the cloud for computing.

The training images are preferably divided about 20% for testing or evaluation, and about 80% for actual training. The training data set is used to train the ANN, adjusting the weight bias. Then on each Epoch, or loop iteration, the testing data is used to evaluate how successful classification has been. The training is complete when the classification losses are within acceptable criteria. Training is a one-off, offline activity, not performed in the actual AVM 28 itself.

Therefore creation of optimum training data will typically include: product background; lighting environment; object to object detection and relative position; single and multi objects per training image; number of training images; quality, size, bit depth of training image; grounded truth bounding box definition; and training convergence, with different accuracy or losses for different types of ANN. The training images should avoid object occlusion or overlapping which hides the complete boundary of each product.

Once trained, the ANN is stored and packed into an efficient execution format to speed up the inference or prediction evaluation and suitably loaded or transmitted to the AVM computer 44.

The AVM camera 42 should have optical and digital performance suitably matching that of the training camera 56 to best match performance of the specific ANN trained from the images provided therefrom.

Figure 9:
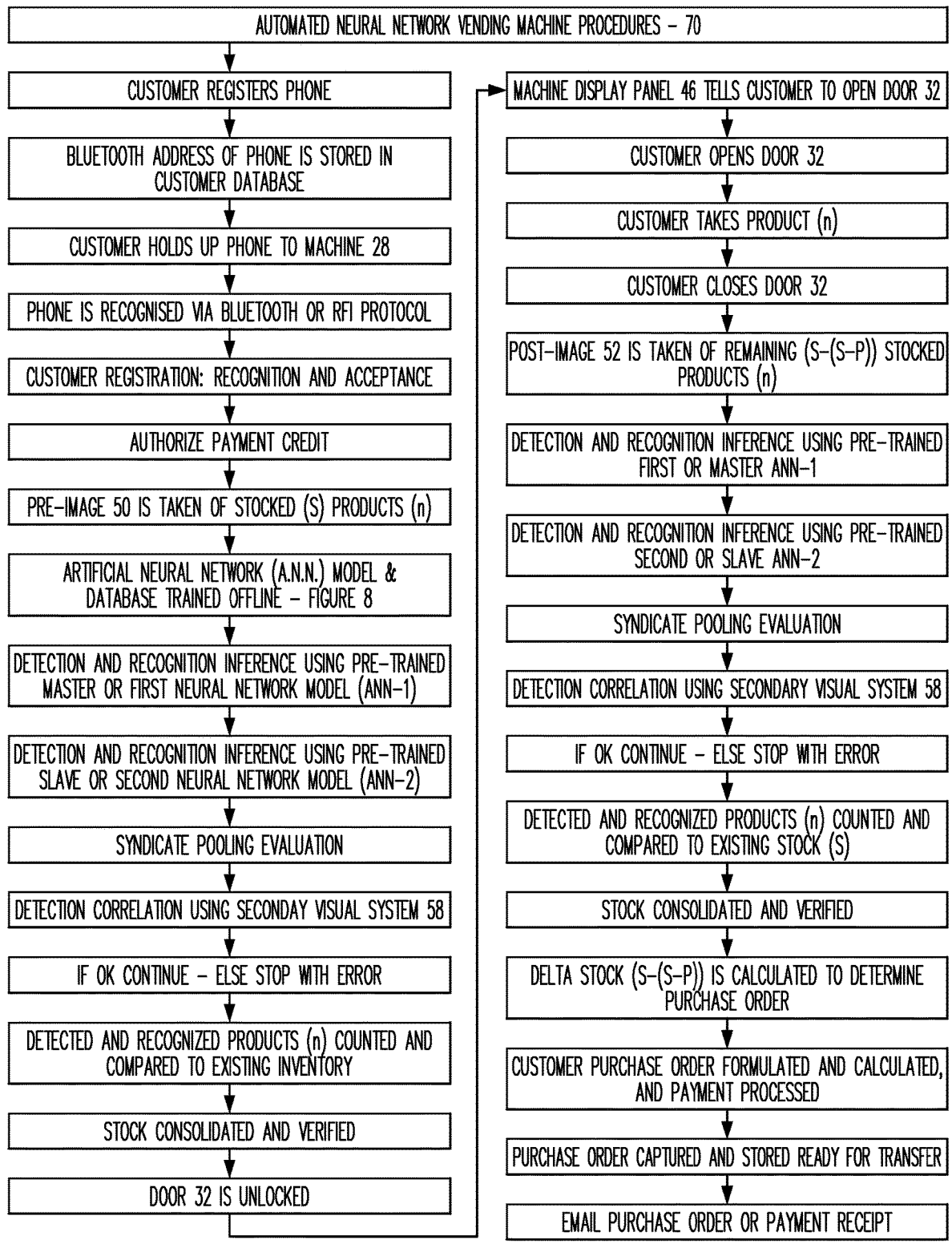
FIG. 9 is a flowchart of operation of the AVM shown in FIGS. 5 and 7.

FIG. 9 presents a detailed vending flowchart 70 of a typical vending transaction by a customer using the AVM 28. The optimized pre-trained ANNs from the above training are loaded into memory of the AVM computer 44, together with the classification, merchandise, name look-up table.

Images of the displayed products (n) should be taken by the AVM camera 42 with a suitable resolution or normal depth of about 1024×1024 pixels, for example. The image data is suitably converted into a numerical arrangement and normalized into a format that can be used in the ANNs.

The ANNs once provided with the image data, processes that data, and the trained detection and recognition inference routine gives a confidence rating as an indication of prediction accuracy. There is a confidence rating for each of the predefined product classes.

This evaluation is not precise. Both detection and recognition inference stages come with corresponding confidence levels, which are combined to give an overall object recognition percentage. Only objects with a confidence level greater than a suitable visual threshold value are classified into the inventory. The setting of these threshold values controls accuracy of the master merchandise inventory.

Accuracy logic may be based on the primary and secondary concept. If the primary SPE disagrees, then an error is called requiring human interaction, which normally just means rearranging the merchandise and resetting the AVM 28 again with a new inventory image.

If the secondary SVRS 58 system disagrees with the primary SPE, then an error is only called if outside a workable tolerance, e.g. primary detects 20 products in the image, and secondary detects only 10 products in the same image then an is error generated.

The results of development experiments suggest that for overall best accuracy, product display should have white spaces between product layout, no significant overlaps between products, product description or name visible, camera alignment or orientation for full stock viewing, fewer than 100 products on display, and ANN performance resolved to acceptable losses levels of about less than 0.05 for the RCNN and less than about 2.0 for the SSD.

The basic purchase sequence has extremely simple steps in which a user or passenger simply approaches the AVM 28, pre-authorizes payment, opens the cabinet door 32, exams and manually selects any one or more products (n), and closes the door 32, with the AVM 28 then automatically identifying the removed product and billing or charging payment to the passenger's pre-authorized form of payment.

The pre-trained first and second ANNs are specially configured for detecting and identifying the stock products in the corresponding pre-image 50 and post-image 52 to infer any product removed or missing from the post-image 52 and thereby selected by the customer.

In the purchase sequence flowchart 70, the passenger goes to the vending machine 28 and reviews available products (n) through the clear window display door 32; taps a cellphone or payment card on to the machine display panel 46 (RFID, Bluetooth, or similar, or may also be via Airline phone app); the cabinet door 32 unlocks; the machine takes an initial inventory snapshot or pre-photo 50 of product inventory (S); the passenger opens the door 32 and takes one or more products (n) if they want; closes door 32, which self-locks; the machine takes a second inventory snapshot or post-photo 52 of the so modified inventory (S-(S-P)) and calculates the order or purchase of the selected one or more product items, e.g. product 13 (P13) taken; and the payment system resolves order and charges purchased item(s) to passenger's payment method, after which the remaining inventory (S-(S-P)) in the machine is automatically updated.

Upon stocking the cabinet 30, a series of inventory images are taken by the camera 42 to determine and record the initial inventory of products (n) actually stocked (S) in the vending machine, and a product inventory database is correspondingly updated.

A new image is taken by the camera immediately before each user or customer selection, which new image is used to visually detect and recognize all products stocked in the cabinet 30. The inventory data is used as verification of the preselection image to improve accuracy and robustness.

After product selection, a second image is taken by the camera to detect and recognize the present state of the displayed stock contained in the display cabinet 30. Product inventory is updated and allows for product movement, misalignment, and out-of-placement in the cabinet 30, as well as an in-situ determination of which one or more display items have been removed from the display cabinet.

This second image is verified against the initial inventory database and the preselection inventory database, and the expected machine stock is adjusted or corrected as required.

As indicated above, the ANN-based aircraft vending machine 28 can be extremely simple in physical configuration having minimal basic components including a secure or lockable display cabinet 30, a precision camera 42 with a suitable field-of-view for accurately recording one or more images of the entire displayed stock (S), and an integral electronic payment mechanism all controlled by a common programmable computer 44 having specially configured software therein.

These basic mechanical components can readily be designed for aircraft use, and suitably certified under required Government Aircraft Regulations. Any suitable payment support system can be used to provide convenient payment options.

Any suitable product inventory support system can be used to maintain an initial inventory database for the vending machine, and then provide in-situ updates thereof as the vending machine is used and the inventory stock (S) therein is depleted and replenished by the cabin crew when convenient.

The AVM camera 42 is suitably used to establish accurate inventory inside the display cabinet just before and just after the passenger makes a selection by removing one or more items from the display shelf.

Such removed items are then compared with the trained inventory database to accurately determine their identity and sales price in completing the sales transaction, after which the inventory database is updated. The next subsequent vending purchase will be similarly made by the before-and-after images of the display shelf to accurately identify any additional product (n) removed therefrom for purchase.

As the display shelves are depleted of items during a series of sales, the display shelves may be restocked by the cabin crew by simply placing new items in available shelf space and closing the cabinet door. The next before-sale image will then automatically update the display shelf inventory using the previously trained inventory identification, and the next after-selection image will accurately determine the identification of any removed product (n) and the sale price therefor.

Accordingly, accurate inventory management may be maintained firstly by analyzing the pre-image of the starting inventory stock stored in the secured cabinet 30 to detect and recognize the individual products (n); allowing dispensing or removal by the user of any stored product; analyzing the post-image of the inventory stock to detect and recognize any such removed product; and then accounting or attributing any such removed product to the user, who may then be suitably billed therefor in a typical vending machine transaction. Inventory management will then be updated to reflect the removed product, and thereby maintain an accurate inventory record of the contents of the display cabinet for subsequent use.

Product detection and recognition may be performed using a single pre-trained artificial neural network that has different stages for detection and recognition; or multiple pre-trained artificial neural networks may be used in syndicate pooling configuration for product detection and recognition depending on product configuration and desired identification accuracy.

The detection stage may be factory trained, and therefore hardwired into the database. The recognition stage may have new or additional products added to the master inventory as desired.

The AVM 28 described above can be extremely lightweight, reliable, swift, and certifiable in providing a novel onboard vending solution, and therefore provide an additional airline revenue stream. Aerospace designs, materials, and practices can be effectively used to specially configure the AVM for use in passenger aircraft for use during flight.

The AVM machine can be almost any size and configuration to complement limited available space in a particular aircraft, and needs merely communication and power interfaces. In effect the AVM machine may include standard aerospace computer and camera components in a secure cabinet, which will be simpler to certify.

The camera-based vision system avoids the need for complex mechanisms, which saves substantial weight, and is more readily certifiable for in-flight aircraft use. The AVM can use a cashless, electronic payment system, and article selection will be assessed, monitored, and controlled by a mechanism-less computer based vision system.

The self-service AVM provides a passenger-first experience demonstrating how natural and instinctive interactions with cabin interior products may be achieved while elegantly combining new technologies. The AVM uses Artificial Intelligence (A.I.) to allow the passenger to simply select a product from the self-service display, which is then automatically charged to their account.

The AVM uses an open and accessible products display fully integrated into a high quality aircraft cabin interiors product, combined with Artificial Intelligence to give a natural, non-invasive, instinctive, dynamic, and simple selection interaction.

The AVM can be specially configured in geometry for different locations in passenger or galley compartments for different aircraft to include a custom fit cabinet having glass fronted display shelves, camera viewing of product inventory thereon, phone or e(lectronic)Card activated access door access, and electronic display showing product selection and purchase transaction details. The display case may be mounted atop standard aircraft storage carts for holding replenishment product inventory therein, and an additional waste compartment may be provided therewith.

The AVM combines developments in technology and skillfully executed design to give an improved, simple, interface to aircraft catering products. This gives potential benefits including improved passenger interaction within the cabin in an easy, friendly and more responsive way and giving a more natural, less frustrating, experience. The cabin crew are freed from vending duties, while still giving a passenger an engaging personal service, while still providing a catering revenue stream.

Business-class style self-service throughout the cabin can be provided with multiple AVM machines. The AVM provides static, lightweight, reliable vending technology; and lowers cost of ownership, with no moving parts or mechanisms for dispensing product; and allows complex technology to be introduced and used in a passenger-friendly way.

Developments in Artificial Intelligence and computer vision now mean that various objects can be accurately detected, identified, and recognized Your phone, boarding pass, or credit card can simply open the product display case, and the passenger simply selects any one or more items.

All the time the vision system is watching, once the passenger makes their selection, and closes the door, they are charged for whatever they have selected. No entering the wrong selection number, no stuck packets, no smaller-than-it-looks disappointment: just pickup and go.

All this clever technology is, of course, completely invisible to the passenger, hidden away, silently working in the background, inside a beautiful aircraft AVM machine tailored in geometry for smoothly blending into any available space inside the passenger cabin in a stand-alone unit, galley unit, or wall-mount display unit.

The aircraft AVM machine can therefore be used by the general public, without need for cabin crew assistance. It requires no honest or trust based system. It requires no training. It includes a cashless electronic payment system allowing payment via contactless payment cards, or phone app, Airline app, or payment could be via payment voucher or code.

In summary, by specially configuring the AVM machine for use in aircraft flight to visually identify product inventory, purchases of any items therein may be readily visually identified for automated purchase thereof, without the complexity and weight of conventional vending machines.

Furthermore, the neural dispensing machine 28 described herein may be suitably configured for non-aircraft applications as well, and wherever conventional vending machines are used, or wherever stock dispensing and management may be desired. Any type of product or item suitable for optical detection and recognition by Artificial Neural Network may be used, and stored or displayed in a controlled-access cabinet.

Selection and removal of any such item by a user may then be automatically detected by comparing the post-image and pre-image of the displayed stock as described above. Accounting or attributing removal of the item to the authorized user allows secure self-service operation without need for a supervisor, operator, or attendant, except as required for management, stocking, and malfunction or error intervention. Items may be accurately identified and dispensed from a secure cabinet to any authorized user with accurate accounting or attribution thereto, with or without payment as desired by the intended application, with the aircraft vending application merely being a single example amongst a myriad of other suitable dispensing applications.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of dispensing a product (n) to a user comprising:
   displaying an initial stock (S) of several products (n) on a display shelf (34) in a locked self-service dispensing machine (28);
   authorizing access to said user for selecting and removing any one of said products (n) displayed in said machine (28);
   using a camera (42) mounted inside said machine (28) with horizontal and vertical field-of-view to capture images (50,52) of the entire stock (S) of products (n) displayed on said shelf (34);
   identifying any product (n) removed from said display shelf (34) by said user not by detecting said removed product (13) itself, but by comparing images (50,52) of said displayed stock (S) captured by said camera before and after said product is removed by said user to determine any product missing in said image (52) of the remaining stock; and
   accounting said missing product (13) to said user as being removed by said user from said machine (28).

2. A method of dispensing a product (n) to a user comprising:
   displaying an initial stock (S) of several products (n) on a display shelf (34) in a locked self-service dispensing machine (28);
   authorizing access to said user for selecting and removing any one of said products (n) displayed in said machine (28);
   imaging (50,52) said displayed stock (S) before and after said product (13) is removed therefrom by said user;
   identifying from said imaging (50,52) all products (n) in both said initial stock (S) before product removal and in said remaining stock (S-(S-P)) after product removal;
   identifying any product (n) removed from said display shelf (34) by said user not by detecting said removed product (13) itself, but by comparing said products (n) identified in said initial and remaining stocks to determine any missing product (13) therebetween, and thereby designate said missing product (13) as said removed product (13); and
   accounting said missing product (13) to said user as being removed by said user from said machine (28).

3. A method according to claim 2 further comprising:
   pre-imaging (50) said initial stock (S) of products (n) before product removal;
   identifying said initial stock (S) of products (n) from said pre-image (50);
   post-imaging (52) said remaining stock (S-(S-P)) of products (n) after product removal;
   identifying said remaining stock (S-(S-P)) of products (ii) from said post-image (52); and
   comparing said identified remaining stock (S-(S-P)) and said identified initial stock (S) to identify said missing product (13).

4. A method according to claim 3 further comprising:
   deploying an Artificial Neural Network (ANN) trained to both detect and recognize each product (n) in said stock pre-image (50);
   deploying an Artificial Neural Network (ANN) trained to both detect and recognize each product (n) in said stock post-image (52); and
   comparing said ANN-recognized stock products (n) between said post-image (52) and said pre-image (50) to identify said missing product (13).

5. A method according to claim 4 wherein said ANNs are pre-trained prior to use in dispensing said products (n), with said pre-training comprising:
   imaging an inventory (N) of a multitude of products (n) including said initial product stock (S); and
   training said ANNs to detect and recognize from said imaging each product (n) in said inventory (N) based on correspondingly developed neural signatures (X(n)).

6. A method according to claim 4 wherein the same pretrained ANN is used to detect and recognize said products (n) in both said pre-image (50) and post-image (52).

7. A method according to claim 4 wherein:
   two different ANNs (-1,-2) are deployed in parallel in syndicate pooling evaluation to independently detect and recognize said products (n) in both said pre-image (50) and post-image (52); and
   product recognition must agree for both different ANNs (-1,-2) for both said stock pre-image (50) and stock post-image (52) to identify said missing product (13).

8. A method according to claim 7 wherein said two different ANNs comprise:
   a Single Shot Detector (SSD-ANN-1); and
   a Region-based Convolutional Neural Network (RCNN-ANN-2).

9. A method according to claim 4 further comprising:
   imaging an inventory (N) of a multitude of products (n) including said initial product stock (S);
   creating a secondary signature (Y(n)) for each product (n) in said inventory based on product appearance;
   deploying a Secondary Visual Recognition System (SVRS 58) to identify from said secondary signature (Y(n)) each product (n) in both said stock pre-image (50) and in said stock post-image (52); and
   comparing said stock pre-image (50) and stock post-image (52) to identify said missing product (13) based on said secondary signature (Y(n)) thereof.

10. A method according to claim 9 wherein said secondary signature (Y(n)) is a color signature of said products (n), and said SVRS (58) includes Binary Large Object (BLOB) detection of said color signatures (Y(n)).

11. A method according to claim 9 wherein said secondary signature (Y(n)) is text printed on said products (n), and said SVRS (58) includes Optical Character Recognition (OCR) thereof.

12. A method according to claim 4 further comprising:
displaying said initial stock (S) of products (n) on said display shelf (34) a locked display cabinet (30) inside a vending machine (28);
authorizing access to said user for purchasing from said display cabinet (30);
pre-image (50) and identify therefrom said initial stock (S) of products (n) before unlocking said cabinet (30);
unlocking said cabinet (30) to allow access thereto by said user for removing any one or more of said displayed products (n);
post-image (52) and identify therefrom said remaining stock (S-(S-P)) of products (n) after a product (13) has been removed by said user;
matching products (n) identified in said pre-image (50) and said post-image (52) to determine said product (13) missing from said post-image (52); and
charging payment to said user for said missing product (13).

13. A method according to claim 12 further comprising:
displaying said products (n) on multiple shelves (34) inside said display cabinet (30) behind a locked display door (32);
mounting a digital camera (42) inside said cabinet (30) with horizontal and vertical field-of-view to capture images (50,52) of the entire stock (S) of products (n) displayed on said multiple shelves (34);
joining said camera (42) to a digital computer (44) housed inside said vending machine, with said computer (44) including said trained ANN programmed therein;
pre-image (50) using said camera (42) and identify using said trained ANN said initial stock (S) of products (n) displayed on said multiple shelves (34) before said user opens said door (32);
post-image (52) using said camera (42) and identify using said trained ANN said remaining stock (S-(S-P)) of products (n) displayed on said multiple shelves (34) after user removes a product (13) and closes said door (32); and
determine said product (13) missing from said post-image (52) and charge payment therefor to said user.

14. A method according to claim 13 wherein the same pretrained ANN is used to detect and recognize said products (n) in both said pre-image (50) and post-image (52).

15. A method according to claim 13 wherein:
two different ANNs (ANN-1, ANN-2) are deployed in parallel n syndicate pooling evaluation to independently detect and recognize said products (n) in both said pre-image (50) and post-image (52); and
product recognition must agree for both different ANNs for both said stock pre-image (50) and stock post-image (52) to identify said missing product (13).

16. A method according to claim 15 wherein said two different ANNs comprise:
a Single Shot Detector (SSD-ANN-1); and
a Region-based Convolutional Neural Network (RCNN-ANN-2).

17. A method according to claim 16 further comprising:
imaging an inventory (N) of a multitude of products (n) including said initial product stock (S);
creating a secondary signature (Y(n)) for each product (n) in said inventory based on product appearance;
deploying a Secondary Visual Recognition System (SVRS 58) to identify from said secondary signature (Y(n) each product (n) in both said stock pre-image (50) and in said stock post-image (52); and
comparing said stock pre-image (50) and stock post-image (52) to identify said missing product (13) based on said secondary signature (Y(n)) thereof.

18. A method according to claim 13 further comprising:
mounting said vending machine (28) to an aircraft fuselage (22) inside a passenger cabin (26), with said display cabinet (30) accessible to passengers during flight; and
said vending machine (28) having minimal complexity and weight as characterized by the express absence of systems for directly identifying and automatically dispensing any product from said display cabinet including barcode readers (62), Radio-Frequency Identification (RFD) detectors (64), and mechanically-driven dispensing chutes (66).

19. A method according to claim 1 further comprising:
displaying said initial stock (S) of products (n) in random locations on multiple display shelves (34) in a display cabinet (30) in an automated vending machine (28) having a locked display door (32) through which said products (n) are visible;
said cabinet (30) including a digital camera (42) having a field-of-view including the entire stock (S) of products (n) displayed on said shelves (34);
said camera (42) being operatively joined to a digital computer (44) configured in software for identifying said product (13) removed by said user from said cabinet (30) by comparing pre and post images (50,52) taken by said camera (42) of said displayed stock (S) before and after said product removal to determine any product (13) missing in said post-image (52) of remaining stock (S-(S-P));
said computer (44) being further configured for authorizing user access to said locked cabinet (30), unlocking and re-locking said door (32) before and after product removal, and processing payment from said user for said missing product (13).

20. A method according to 19 wherein said computer software includes:
a first Artificial Neural Network (ANN-1) pre-trained to both detect and recognize each product (n) in said stock images (50,52);
a second Artificial Neural Network (ANN-2) differently configured than said first ANN, and pre-trained to both detect and recognize each product (n) in said stock images (50,52);
said first and second ANNs being joined in parallel in syndicate pooling evaluation to independently detect and recognize said products (n) in both said pre-image (50) and post-image (52);
said software is further configured for comparing said ANN-recognized stock products (n) between said post-image (52) and said pre-image (50) to identify said missing product (13); and
said product recognition by said first and second ANNs must agree for both said stock pre-image (50) and said stock post-image (52) to identify said missing product (13).

21. An automated vending machine (28) comprising:
a display cabinet (30) having a locked display door (32), and including multiple display shelves (34) for displaying through said door (30) an initial stock (S) of several products (n) for sale;

a digital camera (42) mounted inside said cabinet (30) with a field-of-view including the entire stock (S) of products (n) displayed on said shelves (34);

a digital computer (44) operatively joined to said camera (42), and configured in software for identifying any product (13) removed from said cabinet (30) by a user not by detecting said removed product (13) itself, but by comparing pre and post images (50,52) taken by said camera (42) of said displayed stock (S) before and after said product removal to determine any product (13) missing in said post-image (52) of remaining stock (S-(S-P)); and said computer (44) further configured to authorize access to said user, unlock and re-lock said door (32) before and after product removal, and processing payment from said user for said missing product (13).

22. A vending machine (28) according to claim 21 wherein said computer software includes:

a first Artificial Neural Network (ANN-1) pre-trained to both detect acid recognize each product (n) in said stock images (50,52);

a second Artificial Neural Network (ANN-2) differently configured than said first ANN, and pre-trained to both detect and recognize each product (n) in said stock images (50,52);

said first and second ANNs being joined in parallel in syndicate pooling evaluation to independently detect and recognize said products (n) in both said pre-image (50) and post-image (52);

said software is further configured for comparing said ANN-recognized stock products (n) between said post-image (52) and said pre-image (50) to identify said missing product (13); and said product recognition by said first and second ANNs must agree for both said stock pre-image (50) and said stock post-image (52) to identify said missing product (13).

* * * * *